United States Patent [19]

Desai

[11] 4,200,500
[45] Apr. 29, 1980

[54] METHOD OF PREVENTING THE ADHESION OF SCALE TO THE HEATING SURFACES OF A THERMAL DESALINATION APPARATUS

[75] Inventor: Natvarlal B. Desai, Dinslaken, Fed. Rep. of Germany

[73] Assignees: Grillo-Werke Aktiengesellschaft, Duisburg; Ludwig Taprogge Reinigungsanlagen für Röhrenwarmeaustauscher, Düsseldorf, both of Fed. Rep. of Germany

[21] Appl. No.: 849,252

[22] Filed: Nov. 7, 1977

[30] Foreign Application Priority Data

Nov. 11, 1976 [DE] Fed. Rep. of Germany ....... 2651438

[51] Int. Cl.$^2$ ................................................ C02B 5/06
[52] U.S. Cl. ............................... 203/7; 159/DIG. 13; 210/58; 252/180
[58] Field of Search ................... 159/DIG. 13; 203/7; 210/54, 58; 252/180, 181; 526/272; 260/346.6, 346.74

[56] References Cited

U.S. PATENT DOCUMENTS

| | | | |
|---|---|---|---|
| 2,839,550 | 6/1958 | Wiggerink et al. | 260/346.6 |
| 3,715,307 | 2/1973 | Johnson et al. | 159/DIG. 13 |
| 3,810,834 | 5/1974 | Jones et al. | 252/180 |
| 3,974,083 | 8/1976 | Suen et al. | 252/180 |
| 4,020,000 | 4/1977 | Suen et al. | 252/180 |
| 4,048,065 | 9/1977 | Suen et al. | 210/58 |

FOREIGN PATENT DOCUMENTS 1521710 10/1969 Fed. Rep. of Germany ........... 252/180
500348 2/1939 United Kingdom .

*Primary Examiner*—Thomas G. Wyse
*Assistant Examiner*—Peter A. Hruskoci
*Attorney, Agent, or Firm*—Karl F. Ross

[57] ABSTRACT

The reaction product of long-chain unsaturated hydrocarbons (fatty derivatives) with maleic acid anhydride and/or maleic acid is added to the salt-containing water of a thermal desalination installation to increase the solubility of the calcium and magnesium salts and prevent encrustation of heating surfaces thereby.

5 Claims, No Drawings

METHOD OF PREVENTING THE ADHESION OF SCALE TO THE HEATING SURFACES OF A THERMAL DESALINATION APPARATUS

FIELD OF THE INVENTION

The present invention relates to a method of reducing the encrustation or preventing the encrustation of heating surfaces, especially those of thermal desalination installations and, more particularly, to the use of an additive to the salt-containing water of a thermal sea-water desalination plant to prevent scale deposition on heating surfaces thereof.

BACKGROUND OF THE INVENTION

Sea water contains, as is well-known, apart from sodium chloride, whose solubility increases with increasing temperature, other salts whose solubility decreases with rising temperature. During the heating and concentration of the water in sea water-vaporization installations for the production of potable water, i.e. sea-water desalination plants, these salts tend to reach a supersaturated state and the crystallize out in the form of crusts or scale on the heating surfaces of the heat exchanger.

The main scale formers are calcium carbonate, magnesium hydroxide and calcium sulfate (see CHEMIE ING. TECH., vol. 47, 1974, No. 16, pp. 664–669). Such scale deposition hinders the heat transfer, reduces the flow cross section through the heat exchanger and reduces the efficiency of the apparatus. Furthermore, it causes significant downtime of the installation for cleaning and descaling. Because of this phenomenon, the art makes use of various additives to reduce or prevent the aforementioned scale or crust deposition on the heating surfaces of thermal sea-water desalination plants.

In one such process, acids are added to the water in the plant in stoichiometric quantities, i.e. a stoichiometric quantity sufficient to react with the calcium and magnesium cations. The acid may be sulfuric acid and reacts with the salt solution so that the carbonates form carbon dioxide which can be removed in a subsequent degassing stage, the water being enriched with sulfate anions. The acid feed is problematical because it gives rise to the danger of increased corrosion and can effect the health of operating personnel. The danger is increased in the event of failure of the control systems and inadvertent oversupply of acid. In addition, since it is practical or economical only to use concentrated acid, the handling of the process is dangerous and difficult. In order to overcome these disadvantage, it has been proposed to introduce polyphosphates into such salt solutions. This technique, however, has been found to be practical only for calcium carbonate deposition and, in addition, has been found to be useful at operating temperatures up to 90° C. because of the thermal instability of the polyphosphates.

The use of chelate-forming agents is uneconomical because they must be added in stoichiometric quantities to the solution at high cost.

It has also been proposed to introduce, the substoichiometric quantities, additives in the form of polymers or copolymers, for example, of hydrolyzed polymaleic acid with a molecular weight of 300 to 5000 (see U.S. Pat. No. 3,810,834) or polymers of maleic acid anhydride as well as copolymers containing one or more monoethylenically unsaturated monomers such as acrylic acid. These copolymers or their hydrolyzates, with a molecular weight of 300 to 1000, are described in German open application DT-OS 24 05 192.

Such additives have been found to increase the solubility of scale- and crust-forming salts and/or form with the latter complexes which do not deposit on the heating surfaces of the sea-water desalination plant.

However, the production of such additives is difficult and relatively expensive and the additives are frequently toxic.

Aromatic solvents in which the polymerization must be carried out, require removal with a high degree of completeness so that distillation processes and units are required. When copolymers are produced as described above, the individual monomers must be supplied in precisely metered quantities to avoid the formation of block polymers which are less effective or ineffective.

Moreover, when the monomers used in the copolymerization process are toxic, any traces of nonreacted monomer must be removed, again by distillation of special crystallization processes and units.

Finally, the polymerization is often carried out with peroxide-type catalysts with a host of problems which are characteristic of the use of such catalyst systems.

It has also been proposed to provide additives, which operate in a similar manner to those described previously, from a mixture of sulfuric acid esters and hydrolyzed polysaccharides, carboxymethyl cellulose and sulfonated fatty alcohols and/or fatty acids (see German open application - Offenlegungsschrift DT-OS No. 21 64 240). The additives thus made are less critical but are still more expensive than desirable since the sulfuric acid esters and sulfonated fatty alcohols or acids must be produced separately from one another. The efficiency of these additives at high temperatures against the formation of calcium carbonate deposits still leaves much to be desired.

OBJECTS OF THE INVENTION

It is the principal object of the present invention to provide a relatively simple, inexpensively produced and high efficiency additive for the purposes described, and which is free from the disadvantages of earlier additives.

Another object of the invention is to provide an improved process for or method for the prevention of scale formation on the heating surfaces of sea-water desalination plants operating by distillation of water from a saline solution.

Another object of this invention is to provide a method of increasing the efficiency of a sea-water desalination plant having heating surfaces.

SUMMARY OF THE INVENTION

These objects and others which will become apparent hereinafter are attained, in accordance with the present invention, by a process for the control or restriction of the deposit of calcium and magnesium salts on the heated surfaces of a thermal sea-water desalination plant which comprises introducing into the saline liquid (solution) therein the water-soluble direct reaction product of an unsaturated long-chain hydrocarbon (fatty derivative) with maleic acid anhydride and/or maleic acid at a temperature of 150° to 200° C. in the absence of solvent or catalysts. This reaction product and/or its alkali-metal salt, especially its sodium salt, is introduced to the water containing dissolved inorganic salts in substoichiometric quantities to reduce scale formation at temperatures up to 140° C. on the heating surfaces of a water-traversed apparatus, especially a thermal sea-water desalination plant.

Thus, according to the invention, an ideal additive to the saline liquid passing along a heating surface at a temperature up to 140° C., to prevent the scale formation upon this surface, is the reaction product of an unsaturated fatty derivative with maleic acid anhydride and/or maleic acid at a reaction temperature of 150° to 200° C. in the absence of solvent or catalyst. The reaction product may be hydrolyzed, as noted below, by water after the reaction, preferably in the presence of dilute sodium hydroxide to the water-soluble alkali-metal (preferably sodium) salt.

When reference is made to the use of the additive in "substoichiometric quantities", it is intended thereby to indicate that the reaction product is supplied to the solution of salts in a quantity less than that which would theoretically react with all of the calcium and/or magnesium cations present in the solution.

The production of the additive according to the invention can be carried out with extreme simplicity. The starting materials can be available in usual technical grade or poorer quality and require no prepurification or other special handling.

The unsaturated fatty derivatives which can be used in accordance with the present invention have hydrocarbon chain lengths of $C_{10}$ to $C_{20}$ and iodine numbers of 80 to 200. Preferably, 80 to 95% of the unsaturated fatty derivative will have a hydrocarbon chain length of $C_{16}$ to $C_{20}$ and an iodine number of 150 to 200.

The fatty derivatives can have terminal carboxyl, ester or alcohol groups according to an important feature of the invention.

The proportions of the fatty derivative to the maleic acid anhydride and/or maleic acid has been found not to be critical in the starting mixture but preferably is between 1:1 and 1:2.5, these proportions being by weight.

The reaction of the two reaction components, namely the fatty component and the maleic component, takes place simply upon heating the mixture to a temperature of 150° to 200° C. in the absence of solvent and catalyst, for a period of thirty minutes and five hours.

During the reaction, the maleic acid anhydride or the maleic acid molecule appears to undergo a $C_4$-ring formation with the hydrocarbon chain of the fatty component. The anhydride ring opens under mild hydrolysis, e.g. with the addition of aqueous sodium hydroxide (dilute).

The reaction is especially pronounced with fatty components having a high proportion of multiply nonconjugated carbon-carbon double bonds, although it also takes place where only a single double bond is provided per molecule of the fatty component or in combination with conjugated carbon-carbon double bonds.

Upon rupture by hydrolysis of the maleic ring, two carboxyl groups are formed per maleic ring as will be apparent from the following reaction scheme which is given by way of example:

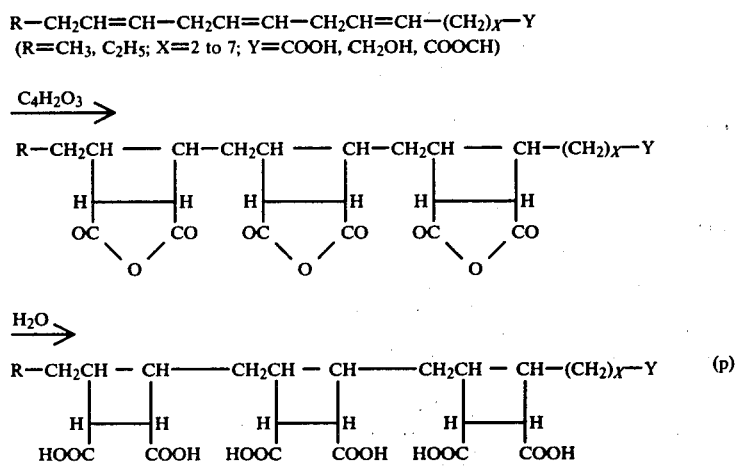

Upon termination of the reaction, the reaction product (P) can be converted into its alkali-metal salt. The preferred alkali-metal salt is, of course, the sodium salt as noted above, although the lithium, potassium and cesium salts may also be used.

Because the reaction of the fatty component and the maleic component is carried out at a high temperature, the reaction product has been found to have a high chemical and thermal resistance so that it can be used as an additive to salt solutions in thermal sea-water desalination plants operating at relatively high temperatures, i.e. up to the 140° C. mentioned previously.

The presence of carboxyl groups ensures that the additive compounds have a high degree of polarity and excellent solubility in water notwithstanding the fact that a long chain fatty derivative was used as the starting compound.

The reaction product can be added to the water of the desalination plant in amounts up to 100 parts per million and best results are obtained with a concentration of 1 to 10 parts per million in the saline liquids to be subjected to thermal desalination.

The reaction product has been found to increase the solubility of all of the calcium and magnesium salts which are present in such solutions and the magnesium appears to form an amorphous flocculate with the compounds which surprisingly do not deposit or grow upon the heating surfaces. Since the reaction product which is used as the additive in the present invention contains only carbon, hydrogen and oxygen, it is completely nontoxic.

Specific Examples

Example 1

26.6 g of a long-chain unsaturated fatty alcohol mixture of the following chemical composition:

hydrocarbon chain-length $C_{16}$ = 5–10% by weight
hydrocarbon chain-length $C_{18}$ = 86–94% by weight
hydrocarbon chain-length $C_{20}$ = 0–2% by weight and an iodine number range of 150 to 170 is reacted with 29.4 g of maleic acid anhydride by heating the mixture over a period of thirty minutes to 150° C. and holding it at this temperature for three hours. At the end of the reaction, the reaction mixture is cooled to 40° C. and hydrolyzed in 180 g of 14% aqueous sodium hydroxide.

Before the treatment with the sodium hydroxide solution, the product has a saponification number of 570.

The solids content of this product is 25%. The product is highly soluble in water and has excellent compatibility with conventional antifoaming agents.

EXAMPLE 2

The fatty alcohol mixture of Example 1 is esterified by conventional techniques with lactic acid. 33.8 g of this ester is reacted directly with 39.2 g of maleic acid anhydride at 170° C. over a period of 4 hours and hydrolyzed as described in Example 1. Prior to hydrolysis, the saponification number of the reaction product was 585.

EXAMPLE 3

79.7 g of a fatty acid mixture (iodine No. 170-180) containing 82 to 88% by weight of unsaturated fatty acids and about 12 to 18% by weight of saturated fatty acids having a chain length of $C_{12}$ to $C_{18}$ is reacted with 156.7 g of maleic acid anhydride at 150° C. for three hours as described in Example 1. The reaction product is then hydrolyzed with 630 ml of aqueous sodium hydroxide (17%). The result is a light-brown product with a solids content of 29%. The saponification number of this product before treatment with the aqueous alkali was about 675.

When the reaction products, after hydrolysis, of each of Examples 1–3 were introduced into a thermal sea-water desalination plant, operating with heating surfaces at a heating temperature of about 135° C., there was practically no deposition of calcium or magnesium-containing scale in amounts of about 2 parts per million of the additive. When the desalination surfaces were used for the same period in the same sea-water concentrates without the additives of Examples 1–3, severe calcium- and magnesium-scale deposition and encrustation were observed.

I claim:

1. A method of desalinating sea water comprising the steps of:
    (a) heating a surface to a temperature above about 135° C.;
    (b) passing a salt solution containing calcium and magnesium over said surface in the form of sea water to concentrate said solution and drive water vapor therefrom;
    (c) directly reacting a polyunsaturated long-chain fatty component of a hydrocarbon chain length of $C_{10}$ to $C_{20}$ with carbon-to-carbon bonds exclusively along the chain and an iodine number of 80 to 200 with a maleic component consisting of maleic anhydride and/or maleic acid at a temperature of 150° to 200° C. in the absence of solvent and catalyst and in a weight ratio of said fatty component to said maleic component of 1:1 to 1:2.5 for a period of thirty minutes to five hours, said fatty component being a compound having a terminal carboxyl, ester or alcohol group;
    (d) hydrolyzing the reaction produce of said fatty component with said maleic component in aqueous sodium hydroxide; and
    (e) introducing the hydrolyzed reaction product into said salt solution in a substoichiometric amount up to 100 parts per million and sufficient to prevent the deposition of calcium and magnesium scale on said surface.

2. The method defined in claim 1 wherein said fatty component includes a hydrocarbon having a chain length $C_{10}$ to $C_{20}$ and an iodine number of 90 to 100.

3. The method defined in claim 1 wherein said fatty component consists at least of 80 to 95% by weight of long-chain unsaturated hydrocarbon with a chain length of $C_{16}$ to $C_{20}$ and an iodine number of 150 to 200.

4. The method defined in claim 1 wherein said fatty component consists at least in major part of unsaturated long-chain hydrocarbons having nonconjugated carbon-to-carbon double bonds.

5. The method defined in claim 1 wherein said reaction product or its alkali-metal salt is introduced into said solution in an amount between 1 and 10 parts per million.

* * * * *